United States Patent
Lipanski

(10) Patent No.: US 9,487,259 B2
(45) Date of Patent: Nov. 8, 2016

(54) ARTICLE FOR TEMPORARILY AFFIXING PERSONAL MUSIC DEVICE

(71) Applicant: Craig Lipanski, Rochester Hills, MI (US)

(72) Inventor: Craig Lipanski, Rochester Hills, MI (US)

( * ) Notice: Subject to any disclaimer, the term of this patent is extended or adjusted under 35 U.S.C. 154(b) by 30 days.

(21) Appl. No.: 14/554,199

(22) Filed: Nov. 26, 2014

(65) Prior Publication Data

US 2016/0144919 A1    May 26, 2016

(51) Int. Cl.
*B62J 11/00*    (2006.01)

(52) U.S. Cl.
CPC ..................... *B62J 11/00* (2013.01)

(58) Field of Classification Search
CPC .... B62J 11/00; B62J 2099/0033; B62J 7/06; B62J 9/003; B62J 2099/006; B62J 2099/004; Y10S 224/929; Y10T 24/1394; Y10T 24/1391
USPC ................. 224/420, 441, 672, 677
See application file for complete search history.

(56) References Cited

U.S. PATENT DOCUMENTS

| 4,754,528 | A | * | 7/1988 | Lyons | ............... | A45F 5/02 224/669 |
| 4,858,798 | A | * | 8/1989 | Siddoway | ............... | A45F 5/02 224/240 |
| 6,390,429 | B1 | * | 5/2002 | Brincat | ............... | B62J 11/00 224/420 |
| 8,596,506 | B2 | * | 12/2013 | Yu | ............... | B62H 5/00 224/419 |
| 8,800,830 | B2 | * | 8/2014 | Hoshi | ............... | B62J 11/00 224/413 |
| 2003/0106974 | A1 | * | 6/2003 | Guertin | ............... | B62J 11/00 248/309.1 |
| 2012/0080464 | A1 | * | 4/2012 | Ericksen | ............... | A44C 5/0007 224/267 |
| 2012/0085797 | A1 | * | 4/2012 | Paez | ............... | A45F 5/00 224/219 |

OTHER PUBLICATIONS

"iHook Dual Edition" by iAmHooked.mobi on Kickstarter.com. N.p., Copyright 2015. Web. Aug. 19, 2015.
"iHook" by iAmHooked.mobi on Kickstarter.com. N.p., Copyright 2015. Web. Aug. 19, 2015.
"6th Generation iPod Nano Mount." Rider's Claw. N.p., n.d. Web. Nov. 25, 2014.
"Motorcycle Mounts for iPhone, Android Phones, and iPods." Rider's Claw, N.p., n.d. Web. Nov. 25, 2014.
"iPod and iPhone Holder," Gunslinger Motorcycle Tours, Np.p., n.d. Web. Nov. 25, 2014.

* cited by examiner

*Primary Examiner* — Adam Waggenspack
(74) *Attorney, Agent, or Firm* — The Dobrusin Law Firm, P.C.; Daniela M. Thompson-Walters; Norman L. Sims

(57) ABSTRACT

The present disclosure relates to an article adapted for temporarily affixing a personal music device to a vehicle. The article includes an attachment arm, a mounting arm integrally attached to the attachment arm with a connecting structure, and a key slot forming an aperture in the attachment arm for attaching a personal music device to the attachment arm. The article may be a one-piece structure.

20 Claims, 4 Drawing Sheets

ARTICLE FOR TEMPORARILY AFFIXING PERSONAL MUSIC DEVICE

FIELD OF INVENTION

The present disclosure relates to an article adapted for temporarily affixing a personal music device to a vehicle.

BACKGROUND OF THE INVENTION

A user of a vehicle can desire to listen to music from a personal music device while operating the vehicle. Conventionally, vehicles such as motorcycles may include a stereo system integrated into the vehicle. These stereo systems may be compatible with personal music devices. The problem encountered with these stereo systems is that only some of the systems offer a temporary placement or storage location for the personal music device while the music device is connected to the stereo and the vehicle is in use. A further problem users encounter is that when the systems offer temporary storage for the personal music device, the storage location is located far from the users' hands and requires removing their hands from the vehicle controls to operate the personal music device. This can present a safety issue in vehicles such as motorcycles, when both hands should be placed on the handles to control the vehicle.

To place the personal music device in closer proximity to the user and still allow the device to be connected to a vehicle's stereo system, there are a few solutions to this problem known in the art. One example of such is the Rider's Claw™ which discloses a multi-piece motorcycle mount that temporarily secures a smartphone directly to a motorcycle clutch or brake perch assembly. "Motorcycle Mounts for iPhone, Android Phones, and iPods," Rider's Claw, N.p., n.d, Web. 15 Oct. 2014. The problems the Rider's Claw™ presents is that the vehicle operator needs to remove their hand from the brake or clutch to operate the personal media device, the mount is large and bulky, and the mount is expensive to purchase. Another solution is the Gunslinger Motorcycle Tours, LLC Shuffle Holder which offers a multi-piece holster, in which an iPod shuffle slides into the holder and claw-style clips snap over a motorcycle handle. "iPod and iPhone Holder," Gunslinger Motorcycle Tours. N.p., n.d. Web. 15 Oct. 2014. The problems the Shuffle Holder presents are that the holder is unable to be placed near the motorcycle controls such that the operator may continue to operate the vehicle and simultaneously manipulate the personal media device; the mount is bulky and unappealing, the mount is manufactured with multiple pieces; and the holder is expensive. The use of mounts for personal media devices is not just limited to motorcycles, as there is a desire to listen to music from these devices in other vehicles, such as bicycles, four-wheelers, wheelchairs, strollers, walkers, and the like.

Thus, what is needed is an article which can temporarily affix a personal music device to a vehicle; permits the vehicle operator to remain in control of the vehicle while manipulating the personal media device; is able to be sold at a lower cost; and offers a more aesthetically appealing integration to the vehicle.

SUMMARY OF INVENTION

The present disclosure relates to an article comprising: an attachment arm; a mounting arm integrally attached to the attachment arm with a connecting structure; and an aperture in the attachment arm forming a key slot for attaching a personal music device to the attachment arm; wherein the article is adapted to temporarily affix the personal music device to a vehicle.

The disclosure relates to an article comprising: an attachment arm; a mounting arm integrally attached to the attachment arm with a connecting structure such that the angle between a surface of the attachment arm facing a surface of the mounting arm is an acute angle; an aperture in the attachment arm forming a key slot for attaching a personal music device to the attachment arm; a first support arm and a second support arm integrally attached to the attachment arm opposite the connecting structure wherein the distance between the first support arm and the second support arm is equal to or greater than a width of a mounting clip of the personal music device; a first aperture in the attachment arm adapted to provide clearance for a bolt head; a second aperture in the mounting arm adapted to provide clearance for a bolt shaft; wherein the article is adapted to temporarily affix the personal music device to a vehicle.

In some preferred embodiments, the article of the disclosure is a one-piece structure. In some preferred embodiments, the article of the disclosure is secured by a bolt that secures a component to a vehicle. In some preferred embodiments, the article of the disclosure is able to be positioned on the vehicle such that a user can manipulate the interface of the personal music device with a thumb while keeping their hand on a vehicle component.

The disclosure further relates to a method for installation of the article of the disclosure to a vehicle comprising: placing the article in a desired position on the vehicle; inserting a shaft of a bolt through the first aperture and the second aperture; and securing the bolt having a bolt head until the bolt head is flush or below a surface of the attachment arm.

The article of the disclosure is able to temporarily affix a personal music device to a vehicle by mounting on the vehicle and temporarily receiving a personal music device. In the embodiments wherein the article is able to be positioned cm the vehicle such that a user can manipulate the personal music device with their thumb while keeping their hand on a vehicle component, the user is able to remain in control of the vehicle while manipulating the personal music device. The one-piece structure enables the article to be manufactured and sold at a lower cost than other personal music device mounts available on the market. The one-piece structure further provides a more visually attractive mount as contrasted to multi-piece mounts. The article may include a coating providing an exterior color or finish that complements the vehicle exterior and provides an aesthetically appealing integration to the vehicle.

DETAILED DESCRIPTION

Figure 1:
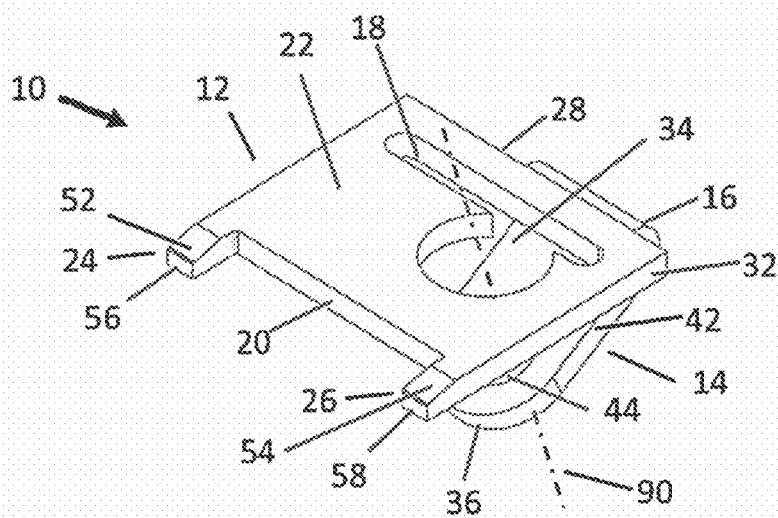
FIG. 1 illustrates an isometric view of the article once formed.

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The disclosure relates to an article which is adapted to temporarily affix a personal music device to a vehicle. A personal music device is any small, portable media device which is able to store and play music fifes. The personal music device further includes a hinged clip which is traditionally used to attach the device to a belt, clothing, exercise arm band, or the like. Examples of a personal music device are an Apple iPod shuffle, SanDisk Sansa Clip, Sony Walkman MP3 Player B-Series, and the like. A vehicle is any means of transport where control of the vehicle is maintained by an operator's grasp on a handle(s) and the vehicle can be motor-powered or non-motor-powered. Examples of a vehicle are a motorcycle, all-terrain vehicle (ATV), moped, bicycle, scooter, mobility scooter, wheelchair, walker, stroller, and the like.

The article comprises an attachment arm. The article further comprises a mounting arm which is integrally attached to the attachment arm with a connecting structure. The article further comprises an aperture in the attachment arm forming a key slot for attaching a personal music device to the attachment arm. In preferred embodiments, the article is a one-piece structure. In some embodiments the attachment arm includes a first support arm and a second support arm integrally attached to the attachment arm opposite the connecting structure.

The article of the disclosure may further comprise any one or more of the features described in this specification in any combination, including the preferences and examples listed in this specification, and including the following features: the article is a one-piece structure; the attachment arm includes a first support arm and a second support arm integrally attached to the attachment arm opposite the connecting structure and the distance between the first support arm and the second support arm is equal to or greater than a width of a mounting clip of the personal music device; the article includes a first aperture in the attachment arm adapted to provide clearance for a bolt head and a second aperture hi the mounting arm adapted to provide clearance for a bolt shaft and smaller than the bolt head; the attachment arm includes a first edge opposite the connecting structure disposed between the first support arm and the second support arm, the distance from the key slot to the first edge is equal to or smaller than the distance of a mounting clip hinge to a mounting clip key tab of the personal music device; the key slot has a width such that the mounting clip key tab fits in the key slot; the first support arm and the second support arm each comprise a chamfer sloping away from the attachment arm, which permit the mounting clip of the personal music device to be securely attached to the attachment arm; the connecting structure is attached to the attachment arm and the mounting arm such that the angle between a surface of the attachment arm facing a surface of the mourning arm is an acute angle; the attachment arm has a thickness such that a mounting clip of the personal music device can be in a fully closed position; a common axis of the first aperture and the second aperture passes through the centers of both apertures; a bolt may be inserted through the first aperture and the second aperture to secure the article to the vehicle; the bolt secures a vehicle component to a vehicle; the vehicle component comprises a throttle, clutch, or brake; the attachment arm has a width equal to or smaller than a width of the personal music device and the mounting arm has a width equal to or smaller than the width of the personal music device; the mounting arm has a width equal to or smaller than the width of the attachment arm; the connecting structure is located relative to the attachment arm such that when the article is affixed to a vehicle a side surface of the attachment arm is adjacent to the vehicle component and a distance between the vehicle component and the side surface of the attachment arm allows a users hand to manipulate a user interface of the personal music device while retaining control of the vehicle component with part of their hand; the attachment arm includes a first edge opposite the connecting structure and distanced from the connecting structure at a distance equal to or smaller than a length of the personal music device; the article is adapted to mount to the vehicle with a bolt having a bolt head; and the mounting arm includes a curved side opposite the connecting structure having a radius about equal to or less than the radius of the bolt head; the article is made of a material that has sufficient strength and modulus to retain the personal music device in a relatively stable position; the article is made of steel, plastic, aluminum, or fiber reinforced plastic; the article is coated with a coating; and an article comprising a combination including: an attachment arm, a mounting arm integrally attached to the attachment arm with a connecting structure such that the angle between a surface of the attachment arm facing a surface of the mounting arm is an acute angle, an aperture forming a key slot in the attachment arm for attaching a personal music device to the attachment arm, a first support arm and a second support arm integrally attached to the attachment arm opposite the connecting structure and the distance between the first support arm and the second support arm is equal to or greater than a width of a mounting clip of the personal music device, a first aperture in the attachment arm adapted to provide clearance for a bolt head, a second aperture in the mounting arm adapted to provide clearance for a bolt shaft, wherein the article is adapted to temporarily affix the personal music device to a vehicle.

The article of the disclosure comprises an attachment arm. The attachment arm serves as the element of the device that a personal music device rests upon or is engaged onto. The attachment arm may be any size and shape so that it can be under a user interface of a personal music device and allow a user to see and/or control the personal music device's user interface. The attachment arm size and shape is adapted such that the vehicle operator may maintain control of the vehicle while manipulating the user interface.

The attachment arm may be substantially planar and rectangular. Preferably the attachment arm has a perimeter similar to the exterior perimeter of the personal music device. The attachment arm can include a top surface, a bottom surface, two side surfaces, a front surface and a back surface. The front surface can face toward the user once affixed to the vehicle. The back surface can face away from the user once the article is affixed to the vehicle. The two side surfaces are parallel to one another and are adjacent to the front and back surfaces.

The attachment arm has a thickness such that it has the strength to sustain the weight of personal music device, the force of the user when the user is manipulating a user interface of the personal music device, and remain stable while in use. The thickness is selected such that the hinge of a personal music device can fully close while the personal music device is affixed to the article. The thickness is the distance from the bottom surface of the attachment arm to the top surface of the attachment arm. The thickness is about the same or less than the distance between an inner surface of a personal music device hinge and a bottom surface of the personal music device. The thickness may be about 0.02 inches or greater, preferably about 0.05 inches or greater, and more preferably about 0.082 inches or greater. The thickness may be about 1.0 inches or less, preferably about 0.2 inches or less, and more preferably about 0.088 inches or less.

The attachment arm's top surface has a surface area. The surface area is selected such that it is large enough to support a personal music device. The surface area is also selected such that it is sufficiently small enough that the appearance of the article is minimized when the personal music device is placed on the top surface. The surface area can be smaller than the surface area of the user interface side of a personal music device.

The attachment arm has a width which is the distance from side surface to side surface. It is preferred that the width is less than a width of the personal music device; it is preferred that the width of the attachment arm provides access to the personal music device side controls; it is preferred that the width of the attachment arm is larger than the width of a personal music device hinge arm. The attachment arm width may be about 0.5 inches or greater, preferably about 1 inch or greater, and more preferably about 1.139 inches or greater. The attachment arm width may be about 2.0 inches or less, preferably about 1.5 inches or less, and more preferably about 1.145 inches or less.

The attachment arm has a length which is the distance from the back surface to the front surface. It is preferred the length is smaller than the length of the personal music device, and more preferred that it is smaller than the length of the mounting clip. The attachment arm's length may be about 0.75 inches or greater, preferably about 0.8 inches or greater, and more preferably about 0.862 inches or greater. The attachment arms length may be about 4 inches or less, preferably about 1 inch or less, and more preferably about 0.868 inches or less.

The article of the disclosure further comprises a mounting arm. The mounting arm serves as a mounting structure to affix the article of the disclosure to a vehicle. The mounting arm is integrally attached to the attachment arm with a connecting structure. The mounting arm can include a bottom surface, a top surface, a back surface, a front surface, and two side surfaces. The top surface and bottom surface of the mounting arm may be substantially planar. The two side surfaces are parallel to one another and adjacent to the front and back surfaces. When the article is mounted to the vehicle, the front surface faces the user and the back surface faces away from the user.

The mounting arm has a thickness. The thickness is the distance from the bottom surface to the top surface of the mounting arm. It is preferred the thickness be the same as the thickness of the attachment arm. The thickness should be sufficient to keep the article secured to the vehicle. It is more preferred the thickness be sufficient such that when the personal music device is affixed to the article, the article remains stable when the vehicle reaches high speeds and allows the article to remain stiff under normal conditions.

The mounting arm includes a width. The width is the distance from side surface to side surface. It is preferred that mounting arm width is selected such that the mounting arm is minimally visible when the article of the disclosure is affixed to the vehicle. It is preferred that the width be equal to or smaller than the width of the attachment arm. The mounting arm width may be about 1 inch or less, preferably about 0.5 inches or less, and more preferably about 0.478 inches or less. The mounting arm width may be about 0.4 inches or greater, and more preferably about 0.472 inches or greater.

The mounting arm has a length. The length is the distance from the back surface to the front surface. It is preferred that the mounting arm length is selected such that the mounting arm is minimally visible when the article of the disclosure is affixed to the vehicle. It is further preferred the length be about the same length or smaller than the length of the attachment arm. The attachment arm's length may be about 0.25 inches or greater, preferably about 0.5 inches or greater, and more preferably about 0.63 inches or greater. The attachment arms length may be about 4 inches or less, preferably about 1 inch or less, and more preferably about 0.69 inches or less.

The article of the disclosure further includes a connecting structure. The connecting structure is any feature of the article that connects the attachment arm to the mounting arm. The connecting structure is preferably integral to the attachment arm; preferably the connecting structure is opposite the front surface of the attachment arm; preferably the connecting structure is located opposite or adjacent support arms of the attachment arm. The connecting structure is preferably also integral to the mounting arm and more preferably the connecting structure is integral to the mounting arm opposite the front surface of the mounting arm. The connecting arm forms an angle between the bottom surface of the attachment arm and the top surface of the mounting arm, such that the surfaces are opposing one another. It is, preferred that the angle orients the attachment arm such that when the article is mounted to a vehicle and a personal music device is affixed to the article it allows a user to see and operate the user interface of the personal music device while operating the vehicle. The angle of the connecting structure may be about 90 degrees or less, preferably about 60 degrees or less, and more preferably about 32 degrees or less. The angle of the connecting structure may be about 28 degrees or more, and more preferably about 30 degrees or more.

The connecting structure includes two side surfaces. The side surfaces may run parallel to the side surfaces of the attachment arm and the side surfaces of the mounting arm. It is preferred that the side surfaces of the connecting structure are continuous with the side surfaces of the mounting arm.

The connecting structure has a thickness. The thickness should be sufficient to maintain a sustained angle between the attachment arm and mounting arm. The thickness Should sustain the angle when the personal music device is affixed to the article. The thickness should further sustain the angle when the personal music device is affixed to the article, the article is mounted to the vehicle, and the vehicle is moving at high speeds. The thickness may be the same as the thickness of either or both the mounting arm and attachment arm.

The connecting structure includes a length. The length of the connecting structure is measured from the point at which the attachment arm's top surface is no longer planar and begins to have a downward curvature toward the mounting arm to the point where the curvature ends and the planar bottom surface of the mounting arm commences. It is preferred the length be sufficient to provide the preferred acute angle. The connecting structure length may be about 0.05 inches or greater, and more preferably about 0.07 inches or greater. The connecting structure length may be about 0.2 inches or less, and more preferably about 0.13 inches or less.

The connecting structure has a width. The width is the distance from the side surface to the side surface of the connecting structure. It is preferred the width be about equal to or less than the width of the attachment arm. It is more preferred that the width be about equal to the width of the attachment arm such that the attachment arm side surfaces are continuous with the connecting structure side surfaces.

The article of the disclosure further includes an aperture in the attachment arm which forms a key slot. The key slot engages the personal music device when the personal music device is attached to the article. The key slot aperture goes through the bottom surface of the attachment arm up towards and preferably through the top surface of the attachment arm. It is preferred the key slot has an ability to engage a key tab of a personal music device hinge. To engage the key tab, the key slot should have similar general shape as the key tab. The shape of the key slot can include curved sides to match curved sides of the key tab. The overall area of the key slot is selected such that the key tab of the personal music device can fit within the key slot.

The key slot should be distanced from a surface of the attachment arm such that the key tab is allowed to fully rest within the key slot while the personal music device is affixed to the attachment arm. It is preferred the key slot is distanced from the front surface of the attachment arm at a distance smaller than the distance from the personal music device's hinge to the key tab. The key slot may be distanced from the front surface of the attachment arm at a distance of about 3.5 inches or less, preferably about 2 inches or less, and more preferably about 0.680 inches or less. They key slot may be distanced from the front surface of the attachment arm at a distance of about 0.25 inches or more, preferably about 0.5 inches or more, and more preferably about 0.674 inches or more. Once the key tab of the personal music device is resting within the key slot and the hinge of the personal music device is in a closed position, the personal music device will have limited movement in the direction from the back surface to the front surface of the attachment arm and side to side movement with respect to the attachment arm.

The article of the disclosure may further include a first aperture located in the attachment arm cutting through the top surface to the bottom surface. The first aperture functions to allow sufficient clearance for a bolt head such that a bolt can pass through the attachment arm. The first aperture can share common area with the key slot or can be a completely separate aperture in the attachment arm. The first aperture can be centered in the attachment arm's top surface or it can be off-center.

The article of the disclosure may further include a second aperture located in the mounting arm. The second aperture functions as the aperture in the mounting aria which the bolt passes through and secures the article to the vehicle. The second aperture functions to provide sufficient clearance for a bolt shaft to pass through while preventing a bolt head to pass through. It is preferred that the second aperture share a common axis with the first aperture to enable the bolt shaft to easily pass through the first aperture and then the second aperture. The second aperture may have a diameter larger than the diameter of the bolt shaft or more preferably about 0.272 inches or greater. The second aperture may have a diameter smaller than the diameter of the bolt head or more preferably about 0.278 inches or less The article of the disclosure may further include a first support arm and a second support arm to provide additional support to the bottom surface of the personal music device. The support arms can provide additional support to the personal music device where the hinge is not present under the bottom surface. The support arms provide additional support without adding bulk, minimal additional surface area, and/or excessive weight to the article. The support arms can enable the hinge to get as close as possible to the front surface of the attachment arm. The first and second support arms are integrally attached to the support arm. It is preferred that the first and second support arms are integrally attached to the support arm opposite the connecting structure. It is more preferred they are integrally attached to the support arm at the front surface of the attachment arm. Each support arm can include an outer surface, an inner surface, a front surface, and a back surface. It is preferred the inner surface is parallel to the outer surface and adjacent the front and back surface. It is preferred the back surface is integral with the front surface of the attachment arm.

The inner surfaces of the first and second support arms should be distanced apart such that they provide clearance for the hinge clip of the personal music device in between the two inner surfaces. It is preferred that the distance between the inner surfaces of the first and second support arms is greater than the width of the hinge clip. The distance between the inner surface of the first and second support arms may be about 2 inches or less, preferably about 1 inch or less, and more preferably about 0.925 inches or less. The distance between the inner surface of the first and second support arms may be about 0.5 inches or greater, preferably about 0.75 inches or greater, and more preferably about 0.919 inches or greater.

The outer surfaces of the first and second support arms should be distanced apart such that the support arms provide support underneath the attachment arm but are either minimally visible or not visible to the vehicle operator when the personal music device is affixed to the article. It is preferred that the distance between the two attachment arm outer surfaces is about equal to the width of the attachment arm. It is preferred that the outer surface of each support arm is continuous with a side surface of the attachment arm.

The support arms have a length such that they are sufficiently long enough to provide support underneath the personal music device where the attachment arm may not provide support, such as when the attachment arm length is less than the length of the personal music device. The length is the distance from the back surface to the front surface of each support arm. It is preferred that the length is such that when the personal music device is affixed to the article, the support arms are not visible to the operator of the vehicle. It is preferred that the length of the support arms is about equal to or less than the length of the personal music device minus the length of the attachment arm. The length of the support arms may be about 0.1 inches or greater, preferably about 0.25 inches or greater, and more preferably about 0.306 inches or greater. The length of the support arms may be about 1 inch or less, preferably about 0.5 inches or less, and more preferably about 0.312 inches or less.

The first and second support arms of the article may each further comprise a chamfer. The chamfer functions to allow the hinge of the personal music device to completely close and enable the key tab to engage in the key slot while the hinge is in contact with the front surface of the attachment arm. The chamfers can be located on the top surfaces of the support arms that come into planar contact with the bottom surface of the personal music device. The chamfers can slope away from the back surface toward the front surface. The degree and length of the slope of the chamfers are selected such that the hinge of the personal music device is able to be open when placing the personal music device to the article. The degree and the length of the slope of the chamfers are selected such that the hinge of the personal music device is able to completely close when the personal music device is affixed to the article. The slope of the chamfers may be about 10 degrees or greater, and more preferably about 11 degrees or greater. The slope of the chamfers may be about 14 degrees or less, and more preferably about 13 degrees or less. The slope of the chamfers may be over a distance from the support arm front surface of about 0.15 inches or less, and more preferably about 0.128 inches or less. The slope of the chamfers may be over a distance from the support arm front surface of about 0.1 inches or greater, and more preferably about 0.122 inches or greater.

In a further embodiment, the article of the disclosure is adapted such that it can be temporarily secured to a vehicle with a fastener. The fastener can be any fastener that securely sustains the article in place while the vehicle is in use. The fastener may be a removable fastener, preferably a threaded fastener, preferably the fastener is a bolt, and more preferably the fastener is a bolt which secures a vehicle component to the vehicle. Examples of a vehicle component are a throttle, brake, clutch, or the like. The bolt can secure the article to the vehicle by sandwiching the mounting arm between the vehicle surface and the bottom of the boll head.

The mounting arm's front surface may further include a radius. The radius functions to provide a surface area of the mounting arm for the bolt head to press down upon when the article is secured to the vehicle. The radius of the mounting arm's front surface may be concentric with the second aperture. The radius should be large enough that sufficient material is present between the mounting arm front surface and the second aperture outer diameter to provide sufficient strength when the article is secured to the vehicle. The radius of the mourning arm front surface is preferably small enough to provide minimal visibility of the mounting arm when the article is attached to the vehicle by the fastener. It is preferred the radius be about equal to or smaller than the radius of the head of the bolt and larger than the radius of the second aperture.

The article may be comprised of any material that provides sufficient stiffness and sufficient strength for supporting the personal music device and sustaining the personal music device in a stable position. It is preferred the material provide the article with sufficient strength and support such that the article is able to withstand the driving speeds of a motorcycle. It is preferred the material is able to maintain its integrity while exposed repeatedly to elements of nature over prolonged periods of time. The material may be steel, plastic, aluminum, reinforced plastic, and the like; it is preferred the article is made of stainless steel; and it is more preferred the article is made of stainless steel rolled to about 1140 MPa tensile strength or greater.

The article may further be coated with a coating which can either be functional, decorative, or both. The coating may provide additional protection to the exterior of the article, such as preventing corrosion or discoloration. The coating may also provide the article with alternative exterior colors or finishes, such as chrome or nickel. Any coating which provides the article with a protective outer layer may be used, such as powder coatings including epoxy powder coatings and the like. The color of the coating may be selected such that it is the same or coordinates with the exterior color of the personal music device or the color may be selected such that it matches or coordinates with, a vehicle's exterior color or finish or a vehicle accessory's color or finish.

The article may further comprise a mourning adapter. Where the article as a one-piece structure may not easily adapt to the vehicle, a mounting adapter may be utilized. The mounting adapter can be any structure that temporarily affixes the article to a vehicle and is able to keep the article secure and sufficiently stable such that a user is able to control the personal music device when it is mounted to the article. The mounting adapter preferably includes an aperture, such that a part of the vehicle may be received within the aperture and the mounting adapter may be placed near a user's hand. The mounting adapter may have a removable fastener which can be used to temporarily secure the article to the mounting adapter. The mounting adapter may include a cavity which can be adapted for receiving a fastener which temporarily affixes the article to the mounting adapter. The mounting adapter may be made of any material of sufficient strength to retain the article securely in place and remain in a stable position on the vehicle. The mounting adapter may be made of steel, plastic, aluminum, fiber reinforced plastic, or the like. Examples of mounting adapters include ring clamps, clamp bands, screw clamps, mounting bracket bands, tie strap clamps, cable clamps, and the like.

The disclosure further relates to a method of manufacturing the article of the disclosure, including: forming the article from a material that has sufficient strength and modulus to retain the personal music device in a relatively stable position; and finishing the article for use.

The article of the disclosure is manufactured by first selecting an appropriate material. The material should have a sufficient strength and modulus for supporting the personal music device and sustaining the personal music device in a stable position. The article is then formed. Forming includes forming the overall shape of the article, creating the apertures, and creating the angle of the connecting structure. Some or all of the apertures can be formed in the same step or a different step as when the overall shape of the article is created. The angle or bend of the connecting structure may be formed in the same step or a separate step as when the overall shape is formed and/or when the apertures are formed. Forming can take as little as one step, where the overall shape, apertures, and connecting structure angle are all created simultaneously or as many steps as required to firm each feature individually. Examples of processes useful for forming the article include: water jetting, stamping, three-dimensional printing, milling, cutting, molding, and/or foam casting. After the article is formed, it is then finished. Finishing may include removing any imperfections from the article. Imperfections may include sharp edges, rough surfaces, or flashing. Finishing may also include coating the article.

A preferred method of manufacturing the article of the disclosure is to begin with a sheet of metal, preferably stainless steel, preferably stainless steel cold rolled to a tensile strength of about 1140 MPa or greater. The overall exterior shape and apertures are formed through any process or method suitable for cutting out the overall shape of the article and the apertures, preferably by water jetting or stamping. The bend of the connecting structure is then formed. After the article has taken on its final shape, the article is finished by removing any sharp edges and smoothing out exterior surfaces, preferably by tumbling the article in a carbide medium. A coating, preferably a powder coating, is then applied to the article to prevent corrosion. Alternatively, the article may be formed by molding, for instance by injection molding.

The disclosure further relates to a method of placing an article to a vehicle which is adapted to temporarily affix a personal music device to a vehicle. The method may comprise the steps of placing the article in a desired position on the vehicle; inserting a shaft of a bolt through a first aperture of the article and a second aperture of the article, and securing the bolt having a bolt head until the bolt head is flush or below a surface of the attachment arm. The method may further comprise removing a bolt having a shaft and a head from a threaded cavity, wherein the bolt secures a vehicle component to the vehicle; placing the article such that the second aperture is aligned with the threaded cavity and the bolt shaft can pass through; inserting the boll shaft through the first aperture, second aperture, and threaded cavity; securing the bolt until the bolt head is flush or below a surface of the attachment arm.

A preferred method of placing the article of the disclosure to a vehicle is by first placing the article to the desired location on the vehicle. The second aperture should align with a cavity of the vehicle that is compatible with the fastener, such as a threaded cavity for a bolt shaft. The fastener is then inserted through the first aperture, the second aperture, and into the cavity. The fastener is then secured, such that the article is securely affixed to the vehicle.

The disclosure further relates to a method of placing the article to a vehicle using a mounting adapter. The method may comprise the steps of opening the mounting adapter, such that the aperture of the adapter enlarges; receiving a portion of the vehicle within the aperture; tightening the mounting adapter to reduce the size of the aperture, such that it remains stable on the vehicle; and affixing the article to the mounting adapter with a fastener.

An exemplary method of affixing the article to a vehicle using a mounting adapter begins with first opening the mounting adapter, such as by removing a fastener from a cavity of the mounting adapter which keeps the adapter closed. By opening the mounting adapter, an aperture of the mounting adapter is large enough to receive a portion of the vehicle, such as a vehicle handle. The mounting adapter is placed to the vehicle by receiving a portion of the vehicle within the aperture of the mounting adapter. The article is then placed to the mounting adapter, such that the second aperture aligns with the mounting adapter's cavity. The fastener is inserted through the first aperture, second aperture, and cavity. The fastener is then secured, both securely affixing the article to the adapter and closing the aperture of the adapter such that it the adapter is secure and stable on the vehicle.

Another exemplary method of affixing the article to a vehicle using a mounting adapter is to begin my first opening the mounting adapter, such as be loosening as tie strap, fastener, or cable. By opening the mounting adapter, an aperture of the mounting adapter is large enough to receive a portion of the vehicle, such as a vehicle handle. The mounting adapter is placed to the vehicle by receiving a portion of the vehicle within the aperture of the mounting adapter. The mounting adapter is then securely affixed on to the vehicle, such as by tightening a tie strap or cable, or securing a fastener. By securing the mounting adapter to the vehicle, the mounting adapter's aperture is closed and reduced in size to tighten around a portion of the vehicle. The mounting adapter includes a cavity; the cavity may be separate from the cavity used by the fastener which opens and closes the mounting adapter through changing the mounting adapter's aperture size. The article is then placed to the mounting adapter, such that the second aperture aligns with the mounting adapter's cavity. A fastener is inserted through the first aperture, second aperture, and cavity. The fastener is then secured, affixing the article to the mounting adapter.

The disclosure further relates to a method of affixing a personal music device to an article where the article is adapted to temporarily affix the personal music device to a vehicle. The method may comprise the steps of opening a mounting clip of a personal music device; placing the personal music device onto the article; and closing the mounting clip of the personal music device such that a mounting clip key tab of the personal music device seats in the key slot.

A preferred method of affixing the personal music device to the article is by first opening the mounting clip of the personal music device. The personal music device is placed onto the article, such that the bottom surface of the personal music device is in planar contact with the top surface of the attachment arm and the hinge of the device is adjacent to the front surface of the attachment arm. The hinge may be in direct contact with the front surface of the attachment arm. The mounting clip of the personal music device is closed, such that the key tab of the mounting clip is inserted into the key slot and the tension in the hinge is released.

An exemplary method of installing and using the article is described hereinafter. First, a bolt may be removed from a component attached to a vehicle exposing a threaded cavity. The bolt may be one that secures a throttle or clutch to a motorcycle handle. The article is then placed onto the vehicle, such that the second aperture is aligned with the cavity, providing sufficient clearance for the bolt to pass through. The bolt shaft is then placed through the first aperture, the second aperture, and inserted into the threaded cavity. The bolt is then secured until the article is securely affixed to the vehicle and is able to sustain a stable position. The bolt is able to secure the article by when the bolt head is under a surface of the attachment arm and more so when the bottom of the bolt head is flush with the top surface of the mounting arm. After the article is secured to the vehicle, a personal music device may then be affixed to the article.

ILLUSTRATIVE EMBODIMENTS

The following descriptions of the Figures are provided to illustrate the invention, but are not intended to limit the scope thereof.

FIG. 1 is an isometric view of an article of the disclosure 10. FIG. 1 illustrates an article 10 which can temporarily affix a personal music device to a vehicle after the article 10 has been completely formed. The article includes an attachment arm 12. The attachment arm 12 is the feature of the article 10 used to provide support under a personal music device (not shown). The attachment arm 12 includes an aperture forming a key slot 18. The attachment arm 12 further includes a front surface 20 that is directed toward the user (not shown) of the article 10, a top surface 22 upon which the personal music device (not shown) rests, a back surface 28 opposite the front surface 20, and a side surface 32 adjacent to both the front surface 20 and back surface 28. A mounting arm 14 is integrally attached to the attachment arm 12 with a connecting structure 16. The mounting arm includes a side surface 42 adjacent to a front surface 36. The attachment arm 12 further includes a first aperture 34 which shares a common axis 90 with a second aperture 44 located in the mounting arm 14. The article 10 includes a first support arm 24 and a second support arm 26 which are integrally attached to the attachment arm 12 for providing further support for the personal music device (not shown). The first and second support arms 24, 26 each include a chamfer 52, 54 which slopes away from attachment arm 12 and toward the from surface 56, 58 of the support arms 24, 26.

Figure 2:
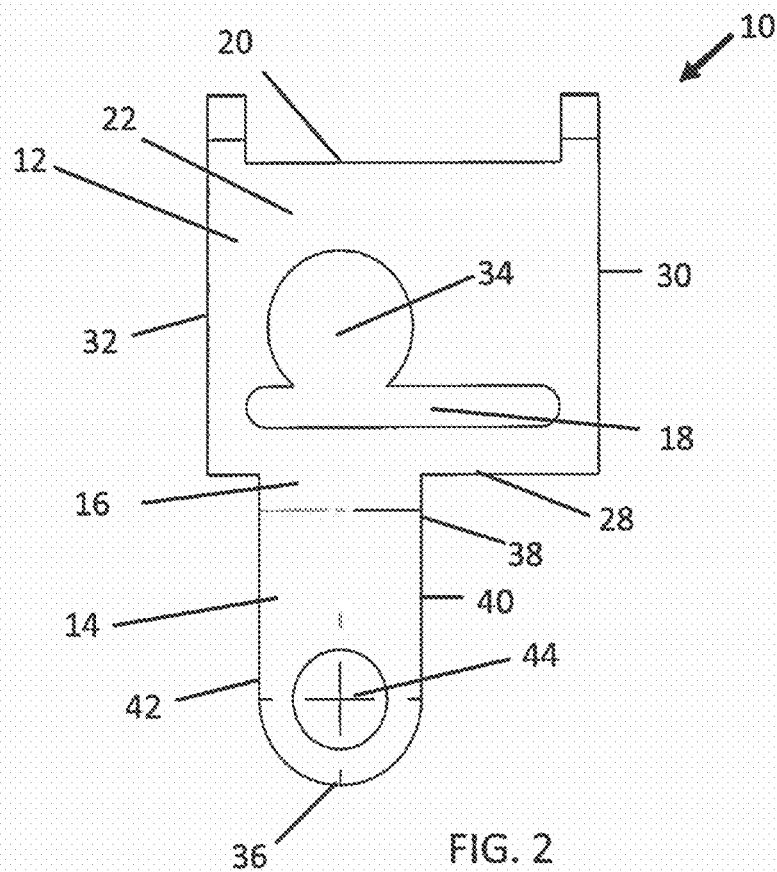
FIG. 2 illustrates a plan view of the top of the article before it is fully formed.

FIG. 2 illustrates a plan view of the top of the article 10 before the connecting structure 16 is fully formed into a bend. The attachment arm 12 includes a back surface 28 and two side surfaces 30, 32. The attachment arm 12 further includes a first aperture 34. The mounting arm 14 includes a front surface 36, a back surface 38, and two side surfaces 40, 42. The mounting arm 14 further includes a second aperture 44. The mounting arm's 14 front surface 36 can be curved with a radius and concentric with the second aperture 44. Also illustrated are the attachment arm's 12 top surface 22 and front surface 20.

Figure 3:
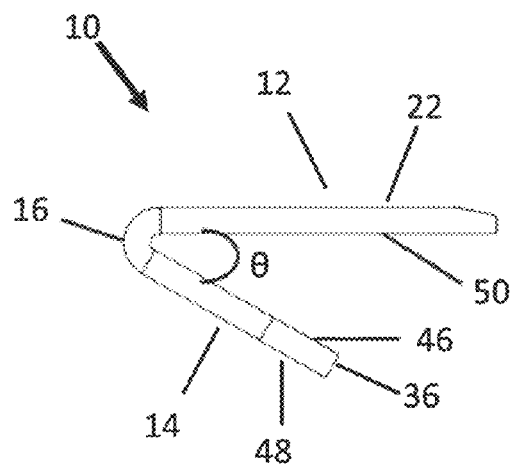
FIG. 3 illustrates a side elevation view of the article of FIG. 1.

FIG. 3 illustrates a side elevation view of the article 10 after the connecting structure 16 has been fully formed. The connecting structure 16 creates an angle θ between the attachment arm 12 and the mounting arm 14. The mounting arm 14 includes a top surface 46 opposite a bottom surface 48. The attachment arm 12 includes a bottom surface 50 opposite its top surface 22 and facing toward the top surface 46 of the mounting arm 14. Also illustrated is the mounting arm's 14 front surface 36.

Figure 4:
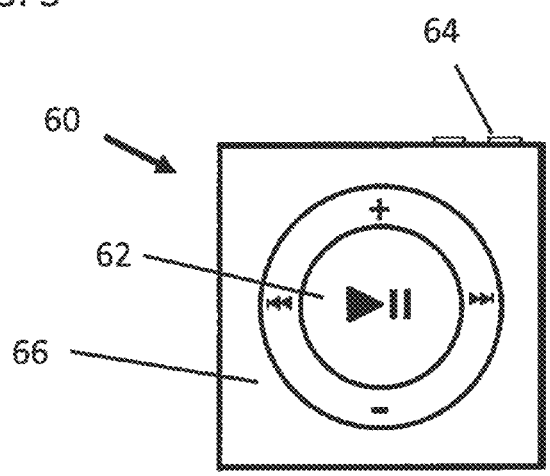
FIG. 4 illustrates a front elevation view of a personal music device.

FIG. 4 illustrates a front elevation view of a personal music device 60. The personal music device 60 includes a user interface 62 to control the media output of the device 60. Further, the personal music device 60 includes side controls 64. Further, the personal music device 60 includes a front surface 66 on the same side of the personal music device 60 that the user interface 62 is located on.

Figure 5:
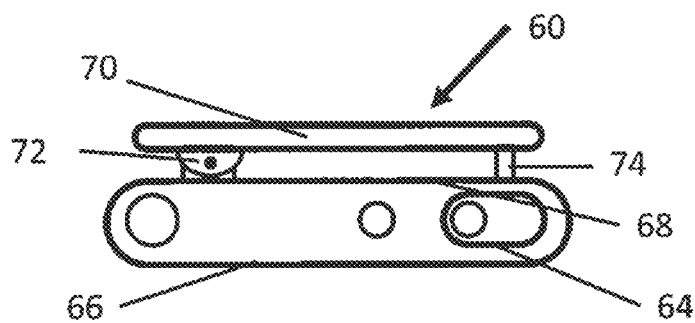
FIG. 5 illustrates a side elevation view of the device of FIG. 4.

FIG. 5 illustrates a side elevation view of the personal music device 60 of FIG. 4. The personal music device 60 includes a back surface 68 opposite the front surface 66. The personal music device 60 includes a mounting clip 70. The mounting clip includes a hinge 72 and a key tab 74. Also illustrated are the side controls 64.

Figure 6:
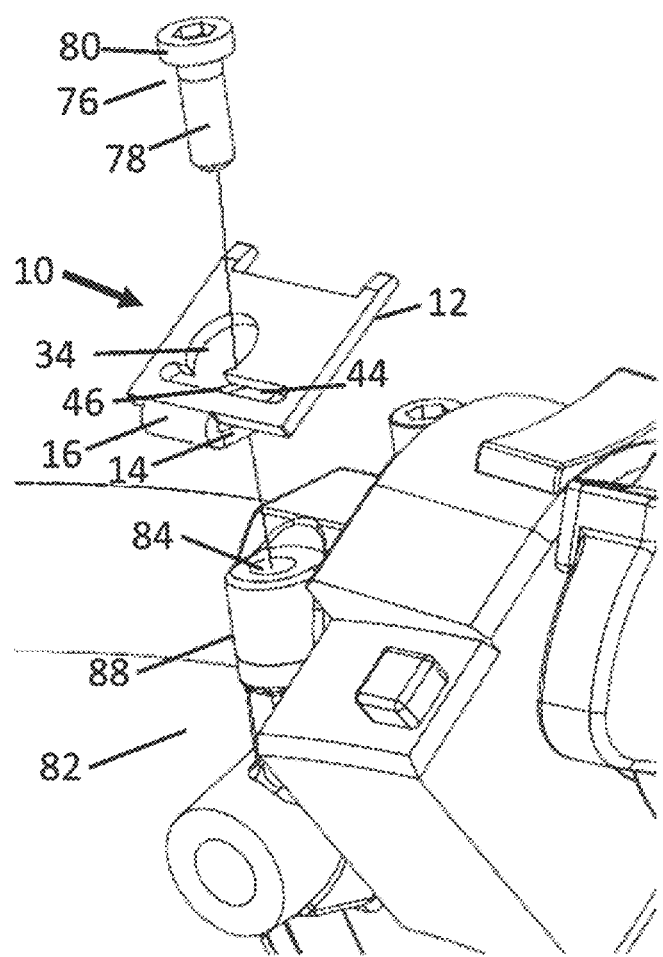
FIG. 6 illustrates an exploded view of the article assembly.

FIG. 6 illustrates an exploded view of the article 10 with a bolt 76. The bolt shaft 78 is inserted through the first aperture 34, then second aperture 44, and then into a cavity 84 of a vehicle component 88 of a vehicle 82. The bolt 76 is secured such that the bolt head 80 is flush to the top surface 46 of the mounting arm 14. Also illustrated is the attachment arm 12 and the connecting structure 16.

Figure 7:
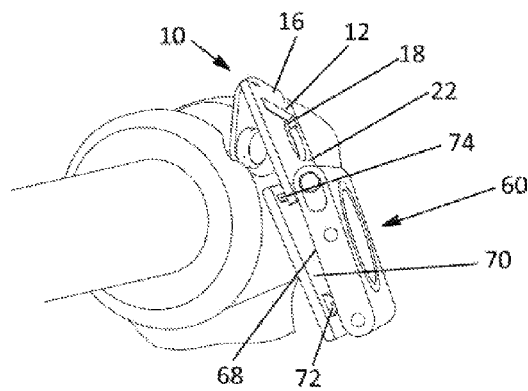
FIG. 7 illustrates an isometric view of the device of FIG. 4 in the open position to be affixed to the article of FIG. 1.

FIG. 7 illustrates an isometric view of the personal music device 60 of FIG. 4 in the open position as it is about to be affixed to the article 10 of FIG. 1. The mounting clip 70 is opened such that the attachment arm 12 can fit between the mounting clip 70 and the hack surface 68 of the personal music device 60. The personal music device 60 is then moved toward the connecting structure 16 by the user. Additionally illustrated are the key slot 18, the top surface 22 of the attachment arm 12 and the hinge 72 and key tab 74 of the personal music device 60.

Figure 8:
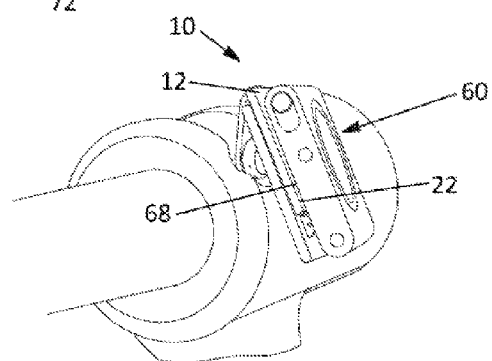
FIG. 8 illustrates an isometric view of the device of FIG. 4 affixed to the article of FIG. 1.

FIG. 8 illustrates an isometric view of the personal music device 60 of FIG. 4 once it is affixed to the article 10 of FIG. 1. The back surface 68 of the personal music device is in planar contact with the top surface 22 of the attachment arm 12. The key tab 74 (not shown) of the personal music device 60 is inserted in the key slot 18 (not shown) of the article 10. The hinge 72 (not shown) of the personal music device 60 is adjacent to the front surface (not shown) of the attachment arm 12.

Figure 9:
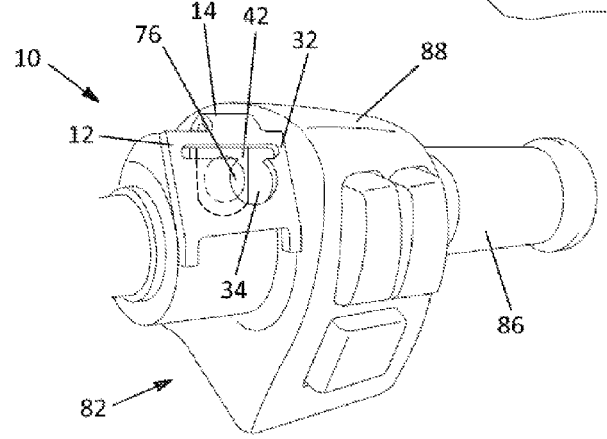
FIG. 9 illustrates an isometric view of the article of FIG. 1 and device of FIG. 4 mounted to a vehicle.

FIG. 9 illustrates an isometric view of the article 10 installed on a vehicle 82. The second aperture 44 (not shown) is aligned with a cavity 84 (not shown) of the vehicle 82. The bolt 76 is inserted through the first aperture 34, the second aperture 44 (not shown), then into the cavity 84 (not shown). The bolt 76 is secured to retain the article 10 to the vehicle 82 in a stable position. The side surface 32 of the attachment arm 12 is distanced from the side surface 42 of the mounting arm 14 such that the attachment arm 12 of the article 10 is as close as possible to the vehicle component 88, such as a throttle. In this embodiment, the user can manipulate the user interface 62 (not shown) of the personal music device 60 (not shown) while able to maintain control of the vehicle 82. Specifically, the user can maintain their hand on the vehicle handle 86 and their thumb is able to reach over to the user interface 62 (not shown) of the personal music device 60 (not shown).

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps. Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

The invention claimed is:

1. An article comprising:
   an attachment arm; a mounting arm integrally attached to the attachment arm by a connecting structure;
   an aperture in the attachment arm forming a key slot for attaching a personal music device to the attachment arm;
   a first support arm and a second support arm which are parallel and distanced from one another and are integrally attached to the attachment arm at a front surface of the attachment arm which is opposite the connecting structure, and wherein the first support arm and the second support arm extend away from the connecting structure and the front surface;

wherein the first support arm and the second support arm each comprise a chamfer on a top surface opposite a bottom surface of the attachment arm which faces the mounting arm, and the chamfers slope away from the attachment arm;

wherein the article is adapted to retain the personal music device which includes a mounting clip having a mounting clip hinge and a mounting clip key tab;

wherein the chamfers allow the mounting clip hinge of the personal music device to completely close and enable the mounting clip key tab to engage in the key slot; and wherein the article is adapted to temporarily affix the personal music device to a vehicle.

2. The article of claim 1, wherein the article is a one-piece structure.

3. The article of claim 1, wherein
a distance between the first support arm and the second support arm is equal to or greater than a width of the mounting clip of the personal music device.

4. The article of claim 1, wherein the article includes:
a first aperture in the attachment arm adapted to provide clearance for a bolt head;
a second aperture in the mounting arm adapted to provide clearance for a bolt shaft and smaller than the bolt head;
wherein the first aperture shares a common area with the key slot; and wherein an axis of the first aperture and the second aperture passes through the centers of both the first aperture and the second aperture.

5. The article of claim 3, wherein
the distance from the key slot to the front surface is equal to or smaller than the distance of the mounting clip hinge to the mounting clip key tab of the personal music device so that the mounting clip key tab is able to rest within the key slot when the personal music device is affixed to the attachment arm.

6. The article of claim 5, wherein the key slot has a width such that the mounting clip key tab fits in the key slot.

7. The article of claim 1, wherein the connecting structure is attached to the attachment arm and the mounting arm such that an angle between a surface of the attachment arm facing a surface of the mounting arm is an acute angle.

8. The article of claim 1, wherein the attachment arm has a thickness such that the mounting clip of the personal music device can be in a fully closed position.

9. The article of claim 1, wherein the attachment arm has a width equal to or smaller than a width of the personal music device; and
the mounting arm has a width equal to or smaller than the width of the personal music device.

10. The article of claim 9, wherein the mounting arm has a width equal to or smaller than the width of the attachment arm.

11. The article of claim 9, wherein the mounting arm has a width smaller than the width of the attachment arm;
the connecting structure and the mounting arm are located off-center relative to the attachment arm such that when the article is affixed to the vehicle a side surface of the attachment arm is able to be adjacent to a vehicle component; and
a distance between the vehicle component and the side surface of the attachment arm allows a user's hand to manipulate a user interface of the personal music device with a thumb while retaining control of the vehicle component with part of their hand.

12. The article of claim 1, the article is adapted to receive the personal music device so that a back surface of the personal music device is in planar contact with a top surface of the attachment arm; and
wherein the front surface is distanced from the connecting structure at a distance equal to or smaller than a length of the personal music device.

13. The article of claim 1, wherein the article is adapted to mount to the vehicle with a bolt having a bolt head; and the mounting arm includes:
(i) a front surface opposite the connecting structure which is curved having a radius; and
(ii) a second aperture with a radius smaller than and concentric with the radius of the front surface which is adapted to provide clearance for a bolt shaft and smaller than the bolt head; and
wherein the radius of the front surface provides a surface area of the mounting arm for the bolt head to press down upon when the article is secured to the vehicle.

14. The article of claim 1, wherein the article is made of steel, plastic, aluminum, or fiber reinforced plastic.

15. The article of claim 1, wherein the article is coated with a coating.

16. A process comprising:
a) forming the article of claim 1 from a material that has sufficient strength and modulus to retain the personal music device in a relatively stable position; and
b) finishing the article for use.

17. A method comprising:
a) placing the article of claim 4 in a desired position on the vehicle;
b) inserting the bolt shaft of a bolt through the first aperture and the second aperture; and
c) securing the bolt having the bolt head until the bolt head is flush or below a surface of the attachment arm.

18. An article adapted to retain a personal music device which includes a mounting clip having a mounting clip hinge and a mounting clip key tab comprising:
(a) an attachment arm having;
 (i) a front surface;
 (ii) two side surfaces parallel to one another and adjacent to the front surface; and
 (iii) a width which is the distance between the two side surfaces;
(b) a connecting structure opposite the front surface;
(c) a mounting arm integrally attached to the attachment arm with the connecting structure such that the angle between a surface of the attachment arm facing a surface of the mounting arm is an acute angle, wherein the mounting arm includes:
 (i) a front surface which is curved having a radius;
 (ii) two side surfaces parallel to one another and adjacent to the front surface; and
 (iii) a width which is the distance between the two side surfaces and is less than the width of the attachment arm;
(d) an aperture forming a key slot in the attachment arm adapted to receive the mounting clip Key tab for attaching the personal music device to the attachment arm;
(e) a first support arm and a second support arm parallel and distanced from one another which are integrally attached to the attachment arm at the front surface, and the distance between the first support arm and the second support arm is equal to or greater than a width of the mounting clip of the personal music device;

(f) a chamfer in each of the first support arm and the second support arm located on a top surface opposite a bottom surface of the attachment arm which faces the mounting arm, which slope away from the attachment arm with a slope of about 10 degrees to about 14 degrees, wherein the chamfers allow the mounting clip hinge of the personal music device to completely close and enable the mounting clip key tab to engage in the key slot;

(g) a first aperture in the attachment arm which shares a common area with the key slot and is adapted to provide clearance for a bolt head;

(h) a second aperture in the mounting arm smaller than the first aperture, concentric with the radius of the front surface, and adapted to provide clearance for a bolt shaft, wherein an axis of the first aperture and the second aperture passes through the centers of both the first aperture and the second aperture;

wherein the article is adapted to temporarily affix the personal music device to a vehicle; and wherein the article is a one-piece structure.

19. The article of claim 1, where a slope of the chamfers is about 10 degrees or greater to about 14 degrees or less.

20. The article of claim 19, wherein the mounting arm and the connecting structure have a width smaller than the width of the attachment arm; and the connecting structure and the mounting arm are located off-center relative to the attachment arm so that when the article is affixed to the vehicle a side surface of the attachment arm is able to be adjacent to a vehicle component.

\* \* \* \* \*